July 12, 1949.　　　　F. W. SCHWINN　　　　2,476,226
SADDLE MOUNTING

Filed Dec. 31, 1946　　　　　　　　　　2 Sheets-Sheet 1

INVENTOR
FRANK W. SCHWINN
By Albert G. McCaleb
ATTORNEY

July 12, 1949.   F. W. SCHWINN   2,476,226
SADDLE MOUNTING
Filed Dec. 31, 1946   2 Sheets-Sheet 2
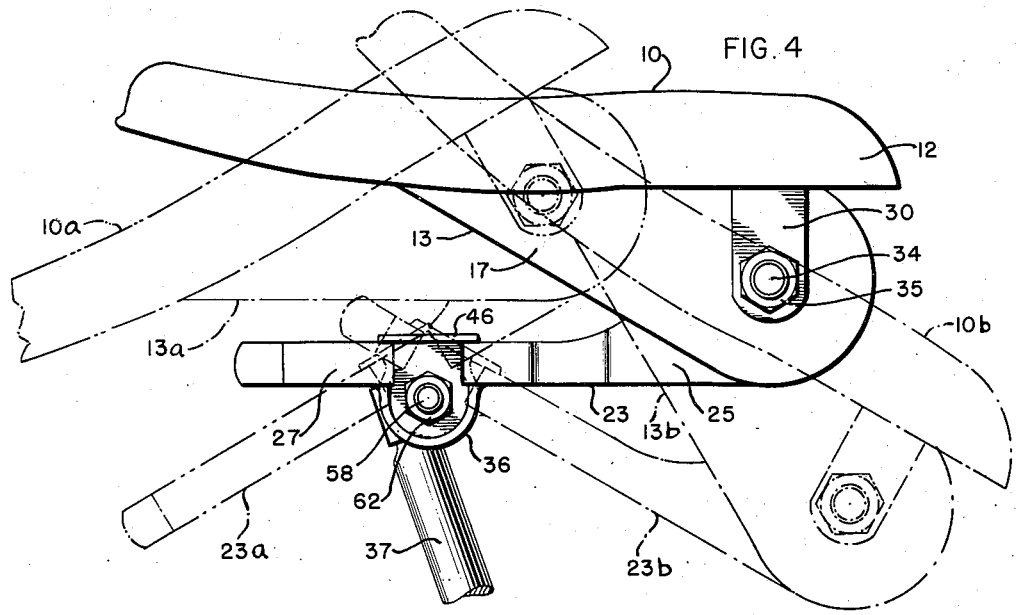
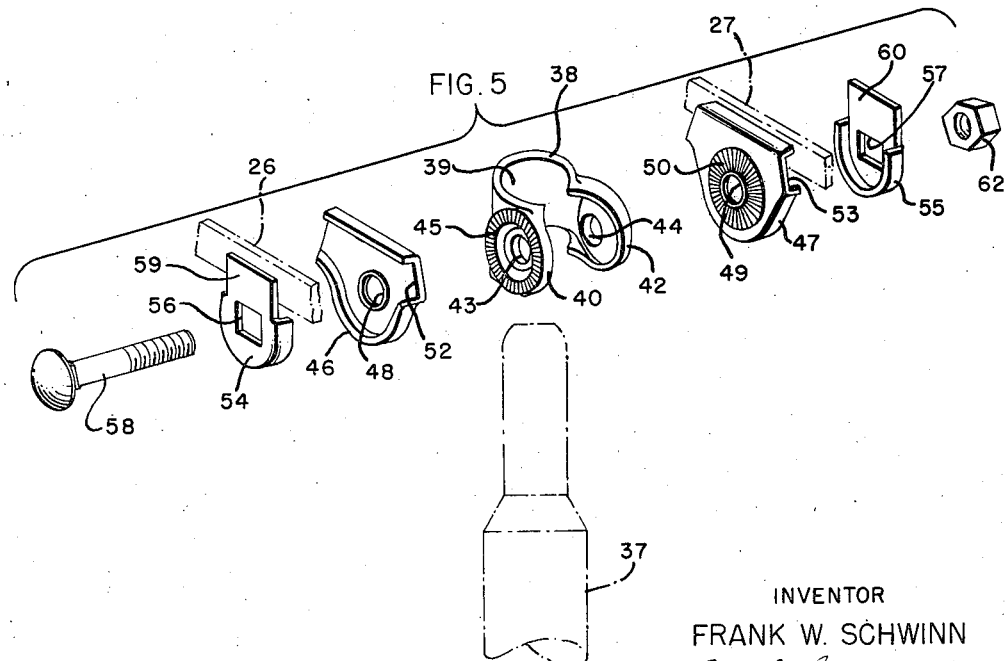
INVENTOR
FRANK W. SCHWINN
BY Albert G. McCaleb
ATTORNEY Patented July 12, 1949

2,476,226

UNITED STATES PATENT OFFICE 2,476,226

SADDLE MOUNTING

Frank Wagner Schwinn, Chicago, Ill.

Application December 31, 1946, Serial No. 719,512

2 Claims. (Cl. 155—5.20)

This invention relates to saddle mountings for bicycles and the like, and more particularly to mountings for saddles having their resilient suspension at the front end of the seat.

One of the objects of the invention is to provide an adjustable mounting structure for the saddles of bicycles and the like wherein resilience is effected by the inclusion of live resilient material, such as rubber, adapted to absorb stresses in shear.

As another object my invention comprehends the provision of saddle mounting of the class referred to in which the position of the saddle may readily be varied angularly or longitudinally relative to a fixed seat supporting post.

Other objects and advantages of the invention will be apparent from the following description and the accompanying drawings in which similar characters of reference indicate similar parts throughout the several views.

In the two sheets of drawings:

Fig. 4 is a side elevational view of the saddle and mounting depicted in Figs. 1, 2 and 3, in which view various adjusted positions of the saddle are indicated by the solid and the dot and dash lines; and Fig. 5 is an exploded view of a part of the saddle mounting wherein the adjoining parts of the saddle mounting and seat post are depicted in dot and dash lines.

Figure 1:
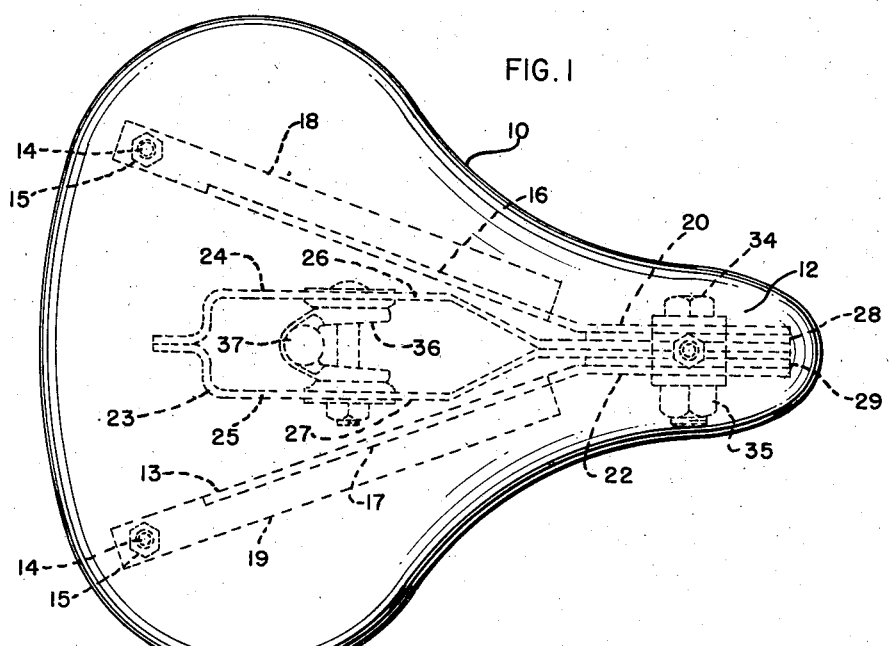
Figs. 1, 2 and 3 are, respectively, top plan, side elevational, and front elevational views of a saddle for bicycles and the like which incorporates a mounting embodying a preferred form of my present invention.

Having reference to the drawings wherein an exemplary embodiment of my invention is depicted for illustrative purposes, the saddle includes a seat 10 which is preferably made of leather and may be of padded construction well known in the art. At its front end the seat has a forwardly projecting portion 12.

A seat frame 13 is secured at one end by fastening means such as screws 14 and coacting nuts 15 to the underside of the seat 10 and extends longitudinally thereof in substantially symmetrical relationship to a longitudinal center line of the seat. In my preferred seat mounting structure, the seat frame 13 includes side plates 16 and 17 of similar construction and shape which are oppositely formed and disposed in spaced and opposed relationship on opposite sides of the longitudinal center line of the seat. Flanges 18 and 19 on the rear portions of the side plates 16 and 17, respectively, support the seat and are secured thereto at the rear ends by the screws 14 and their coacting nuts 15.

At their forward ends the side plates 16 and 17 terminate in substantially plane end portions 20 and 22, respectively, which are disposed in face-to-face and spaced relationship with their plane surfaces substantially parallel to one another. The end portions 20 and 22 underlie the projecting end portion 12 of the seat with their plane surfaces substantially perpendicular to the general plane of the seat.

A cantilever type of support frame 23 is composed of two similarly constructed and oppositely formed side parts 24 and 25 secured together at their opposite ends and having their mid-portions separated laterally of the seat to provide substantially straight and parallel side strips 26 and 27. At their forward ends the side parts 24 and 25 are enlarged to conform substantially to the forward end contours of the side plates 16 and 17 and to provide planar end surfaces for disposition between the plane end portions 20 and 22 of the side plates.

To provide for resilience in my seat support, relatively heavy sheets 28 and 29 of live resilient material have their opposite surfaces bonded to the plane end portions of the side plates and to the planar end portions of the support frame on both sides of the support frame, so that when the seat is supported from the support frame, the resilient material is stressed substantially in shear. The live resilient material may be rubber and the bonding to the seat and support frame surfaces may readily be accomplished by vulcanizing.

In order to support the front end of the seat without interfering with the resilient supporting action of the resilient material, an inverted U-shaped bracket 30 is secured to the lower surface of the projecting end portion 12 of the seat by fastening means, such as a screw 32 and a coacting nut 33. The side legs of the bracket extend downwardly on opposite sides of the plane end portions 20 and 22 of the side plates and are secured thereto by a through bolt 34 having a nut 35, which through bolt is desirably disposed centrally of the portions of the seat frame and support frame which are bonded to the resilient material.

Figure 2:
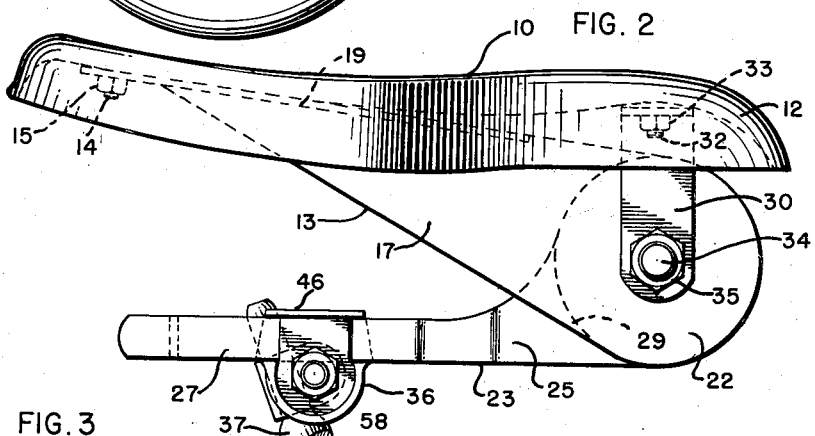
Figure 3:
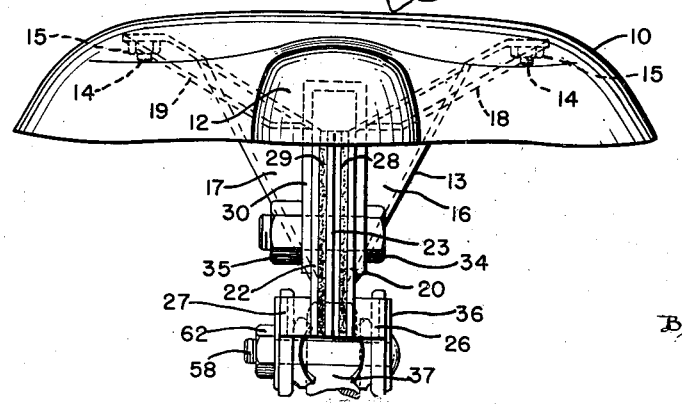

A seat clamp 36 is utilized for securing the saddle to a seat post 37 and to hold the saddle in an adjusted position relative to the seat post. This seat clamp is shown assembled and attached to the saddle in Figs. 1 to 4, inclusive, and with its parts separated in the exploded view of Fig. 5.

Referring particularly to Fig 5, the seat clamp includes a substantially C-shaped central clamping member 38 having an arcuate seat post clamping portion 39 with wing portions 40 and 42 on opposite sides thereof. The wing portions 40 and 42 have aligned central bores 43 and 44, respectively, therein and have their outer surfaces radially serrated around the central bores, as indicated at 45. On opposite sides of the wing portions 40 and 42 are formed channel plates 46 and 47 with bores 48 and 49 adapted to align with the bores 43 and 44 in the wings, as well as radially serrated portions 50 adapted to engage the serrated portions 45 on the wings to hold the formed channel plates in adjusted angular positions relative to the central clamp member 38. Each of the channel plates 46 and 47 has an outwardly disposed longitudinal channel 52 and 53, respectively, adapted to receive one of the side strips 26 and 27 of the support frame. Gripping plates 54 and 55 have openings 56 and 57, respectively therein, which openings are desirably rectangular to receive the rectangular portion of a carriage bolt 58. The gripping plates 54 and 55 include projecting tongues 59 and 60, respectively, which overlie the channels 52 and 53 and the side strips 26 and 27 of the support frame to grip those side strips when the clamp is tightened by a nut 62 threaded onto the end of the carriage bolt.

When the nut 62 is loosened, the seat may be adjusted to a desired angular position of tilt relative to the seat post by rotation about the axis of the bolt when the serrated portions of the clamp member and channel plates are disengaged. Also, the side strips 26 and 27 of the support frame being substantially parallel and slidable in the channels 52 and 53, the seat may be adjusted longitudinally relative to the seat post to suit the desires and comfort of the user.

From the foregoing description of my saddle mounting and the relationship of parts thereof, it may be readily understood that it not only embodies the advantages of the cantilever support frame and the resilience of suspension through a live resilient material, but may also be adjusted to a desired angular and longitudinal position.

For illustrative purposes, I have depicted a range of angular and longitudinal adjustment in Fig. 4. The solid lines represent a relatively level position of the seat, while rearwardly and forwardly tilted positions are indicated by the dot and dash lines at 10a and 10b, respectively. Also, the solid lines show medium longitudinal adjustment of the seat position. The dot and dash lines at 10a, 13a and 23a indicate the saddle moved rearwardly relative to the seat post; while the dot and dash lines at 10b, 13b and 23b depict the saddle moved forwardly relative to the seat post.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a saddle mounting for bicycles and the like for adjustably supporting a saddle relative to a seat post, the combination comprising a padded seat having a relatively narrow forwardly projecting portion at the front, a seat frame including a pair of similar and laterally opposed side plates secured to the seat and diverging rearwardly, said side plates terminating at their front ends in substantially flat portions with faces disposed in substantially parallel and spaced relationship and substantially perpendicular to the general plane of the seat, a support frame including a pair of similar and laterally opposed side parts having substantially parallel and laterally separated side strips at their rear ends and enlarged plane end portions at their front ends, said enlarged plane end portions being disposed in adjacent face-to-face relationship and between the flat front end portions of the seat frame, a layer of live resilient material between each outer face of the enlarged end portions of the support frame and the adjacent face of the flat end portion of the seat frame, said layers of resilient material being bonded to both the seat frame and the supporting frame, a bracket secured to the forwardly projecting portion of the seat, said bracket having legs straddling and secured to the seat frame and support frame by a through bolt extending through the adjacent end portions thereof, and an angularly adjustable seat clamp having means engaging and gripping said laterally opposed side strips of the support frame, said side strips being movable longitudinally relative to the seat clamp, and means for tightening the seat clamp against said side strips to hold the seat in an adjusted angular and longitudinal position relative to the clamp.

2. In a saddle mounting for bicycles and the like for adjustably supporting a saddle relative to a seat post, the combination comprising a padded seat, a seat frame including a pair of similar and laterally opposed side plates secured to the seat and diverging rearwardly, said side plates terminating at their front ends in substantially flat portions with faces disposed in substantially parallel and spaced relationship and substantially perpendicular to the general plane of the seat, a support frame including a pair of similar and laterally opposed side parts having substantially parallel and laterally separated side strips at their rear ends and enlarged plane end portions at their front ends, said enlarged plane end portions being disposed in adjacent face-to-face relationship and between the flat front end portions of the seat frame, a layer of live resilient material between each outer face of the enlarged end portions of the support frame and the adjacent face of the flat end portion of the seat frame, said layers of resilient material being bonded to both the seat frame and the support frame resiliently to support the seat frame and seat relative to the support frame, and an angularly adjustable seat clamp having means engaging and gripping said laterally opposed side strips of the support frame, said side strips being movable longitudinally in relation to the seat clamp, and means for tightening the seat clamp to hold the seat in an adjusted angular and longitudinal position relative to the clamp.

FRANK WAGNER SCHWINN.

REFERENCES CITED

The following references are of record in the file of this patent:

UNITED STATES PATENTS

| Number | Name | Date |
|---|---|---|
| 590,455 | Goodenough | Sept. 21, 1897 |
| 1,118,600 | Troxel | Nov. 24, 1914 |
| 2,303,567 | McWhorter | Dec. 1, 1942 |

FOREIGN PATENTS

| Number | Country | Date |
|---|---|---|
| 42,301 | Netherlands | Jan. 15, 1938 |